R. J. BARRETT.
VALVE.
APPLICATION FILED MAY 29, 1914.

1,128,092.

Patented Feb. 9, 1915.

Witnesses
Robert Karcher
J. H. Bishop

Inventor
Ross J. Barrett.
By F. W. Bond
Attorneys

UNITED STATES PATENT OFFICE.

ROSS J. BARRETT, OF TOLEDO, OHIO.

VALVE.

1,128,092.  Specification of Letters Patent.  Patented Feb. 9, 1915.

Application filed May 29, 1914. Serial No. 841,702.

*To all whom it may concern:*

Be it known that I, Ross J. BARRETT, a citizen of the United States, residing at Toledo, in the county of Lucas and State of Ohio, have invented a new and useful Valve, of which the following is a specification.

My invention relates to certain new and useful improvements in valves and more particularly in check valves.

The object of my invention is to provide a simple and durable check valve in which the valve will seat evenly at all times.

Another object is to provide a valve of the character referred to in which the valve will always seat itself and prevent any leakage.

A still further object is to provide a valve of the character referred to in which the valve proper is easily accessible.

A still further object is the improvement of the construction of the check valve and the construction of its casing in which the valve and casing are simple, durable and comparatively inexpensive.

With the objects in view the invention consists in the novel construction and arrangement of parts, hereinafter described, illustrated in the accompanying drawings, and particularly pointed out in the appended claim, it being understood that various changes in the form, proportions, size and minor details of construction may be made without departing from the spirit or sacrificing any of the advantages of the invention.

Figure 1:
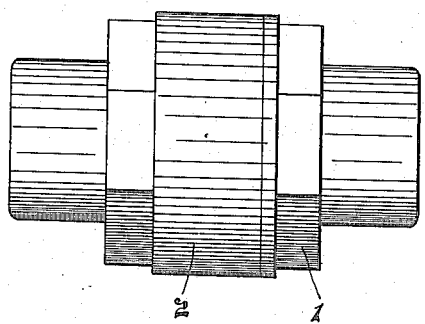
Figure 2:
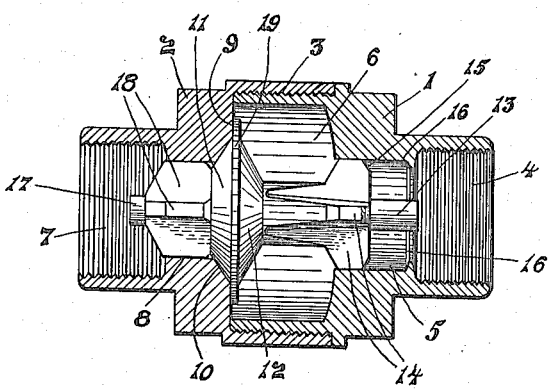
Figure 3:
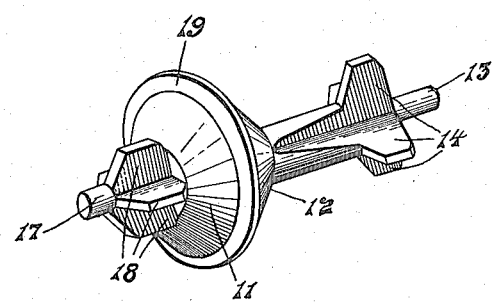

In the drawings: Figure 1 is a side elevation of the valve casing. Fig. 2 is a longitudinal section through the casing provided with a valve constructed in accordance with my invention. Fig. 3 is a detail perspective view of the valve.

Similar numerals of reference indicate corresponding parts throughout the several views.

Referring to the drawings, the casing is composed of the sections 1 and 2 adapted to be connected by means of screw threads 3. The section 1 is provided with the usual internal screw threads 4 by means of which a suitable outlet pipe is connected to the casing and further comprising the restricted portion 5 connecting said screw threaded portion with the enlarged chamber 6 in which chamber the body of the valve operates. The section 2 of the casing is provided with the usual internal screw threads 7 by means of which a suitable inlet pipe is connected to the casing and comprises the restricted opening 8 which connects said screw threaded portion which the valve chamber 6. The forward internal face of the section 2 forms a valve seat as shown at 9 and a beveled valve seat 10 is formed connecting said face with the restricted opening 8.

The valve consists of the frusto-conical portion 11 adapted to seat upon the beveled valve seat 10, and the annular flange 19 located around the base of said frusto-conical portion 11 and adapted to seat upon the valve seat 9, the object and functions of said annular flange being hereinafter more fully described. The body of the valve further comprises a conical portion 12 from which is forwardly extended the relatively long valve stem 13 provided with a series of radial wings 14 slidably mounted within the restricted opening 5 located in the section 1 of the casing. The wings 14 are provided with the beveled forward faces 15 adapted to engage an internal flange 16 formed in the extreme forward portion of the restricted opening 5 and adapted to limit the forward movement of the valve. A shorter valve stem 17 extends backward from the frusto-conical portion 11 of the valve body and is provided with a series of radial wings 18 slidably mounted within the restricted opening 8 of the section 2 of the case.

By the construction above decribed, a valve casing is formed the sections of which may be readily detached when it is necessary to have access to the valve. The wings 14 and 18 provided upon the stems 13 and 17 respectively will at all times be located within the restricted apertures 5 and 8 respectively, thus preventing any tipping of the valve and causing it to seat evenly at all times. By providing the valve body with the frusto-conical portion 11 adapted to seat upon the beveled seat 10 and with the annular flange 19 adapted to seat upon the seat 9 a greater area of the valve body is caused to come in contact with the valve seat than is possible in the ordinary construction thus reducing to a minimum the possible leakage through the valve.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

The combination of a valve casing comprising two separable members, one of said members containing a valve chamber and a restricted passage connected thereto the wall of said valve chamber adjacent said restricted passage being of concave form, an internal stop flange provided within said restricted passage, external screw threads located around the portion containing the said valve chamber, said second member provided with an internally screw threaded portion adapted to engage said externally screw threaded portion, a flat valve seat located within said second member and forming the rear wall of the valve chamber, a beveled valve seat adjacent to said flat valve seat, a restricted passage adjoining said beveled valve seat and a valve comprising a frusto-conical portion adapted to seat against said beveled valve seat, an annular flange located around the base of said frusto-conical portion and adapted to seat against said flat valve seat, a valve stem adjoining said frusto-conical portion, radial wings carried upon said valve stem and adapted to slide within the restricted portion in the second member, a second frusto-conical portion abutting said annular flange, a second valve stem and radial wings carried thereon and adapted to slide within the restricted passage within said first member, said radial wings provided with beveled edges adapted to contact with said internally disposed flange to limit the movement of said valve and to prevent said second named frusto-conical portion from contacting with the concave wall of said valve chamber.

In testimony that I claim the above, I have hereunto subscribed my name in the presence of two witnesses.

ROSS J. BARRETT.

Witnesses:
   CHAS. C. MILLER,
   B. F. MALLETT.